United States Patent
Arata et al.

(10) Patent No.: US 8,317,255 B2
(45) Date of Patent: Nov. 27, 2012

(54) VEHICLE SEAT ASSEMBLY

(75) Inventors: Yuji Arata, Wako (JP); Kazuyuki Kaneko, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 223 days.

(21) Appl. No.: 12/813,889

(22) Filed: Jun. 11, 2010

(65) Prior Publication Data

US 2010/0314920 A1  Dec. 16, 2010

(30) Foreign Application Priority Data

Jun. 11, 2009 (JP) ................. 2009-140421
Jun. 11, 2009 (JP) ................. 2009-140555
Jun. 11, 2009 (JP) ................. 2009-140557

(51) Int. Cl.
*B62D 25/08* (2006.01)

(52) U.S. Cl. ............... 296/193.02; 296/191; 296/65.16; 296/1.08

(58) Field of Classification Search ............ 296/65.16, 296/65.03, 67, 66, 65.17, 68.17, 68.18, 193.02, 296/1.08, 191; 297/378.12
See application file for complete search history.

(56) References Cited

U.S. PATENT DOCUMENTS

| | | | | |
|---|---|---|---|---|
| 3,756,655 A | * | 9/1973 | Perkins | 297/378.12 |
| 5,741,046 A | * | 4/1998 | Leuchtmann et al. | 297/378.13 |
| 6,820,913 B2 | * | 11/2004 | Macey et al. | 296/65.13 |
| 7,614,702 B2 | * | 11/2009 | Kubler et al. | 297/378.13 |
| 2009/0322113 A1 | * | 12/2009 | Parnaik et al. | 296/37.16 |

FOREIGN PATENT DOCUMENTS

| | | |
|---|---|---|
| JP | 58-21781 | 5/1983 |
| JP | 61-057436 | 3/1986 |
| JP | 62-66827 | 4/1987 |
| JP | 03-11938 | 2/1991 |
| JP | 07-002004 | 1/1995 |
| JP | 10-243840 | 9/1998 |
| JP | 2007-050815 | 3/2007 |

* cited by examiner

*Primary Examiner* — Glenn Dayoan
*Assistant Examiner* — Pinel Romain
(74) *Attorney, Agent, or Firm* — Rankin, Hill & Clark LLP

(57) ABSTRACT

A vehicle seat assembly includes a side support capable of supporting a side portion of the torso of an occupant seated in the seat. The seat has a seatback capable of being tilted up or down relative to a seat cushion. A support shaft extending from a lateral surface part of the seatback in a widthwise direction toward an outside of a vehicle is rotatably supported by a bracket. A spring for urging the seatback in a forward-tilting direction is disposed between the support shaft and the bracket. The bracket and the spring are positioned proximately to a rear surface part of the side support.

14 Claims, 11 Drawing Sheets

VEHICLE SEAT ASSEMBLY

FIELD OF THE INVENTION

The present invention relates to a vehicle seat assembly including a seatback that also function as a partition wall between a passenger compartment in a front part of the vehicle and a luggage compartment in a rear part of the vehicle and, more particularly, to a seatback foldable forward.

BACKGROUND OF THE INVENTION

Vehicle seat assemblies are sometimes provided with a seatback that also functions as a partition wall between a passenger compartment in the front of the vehicle and a luggage compartment in the rear of the vehicle. A vehicle seat device of such description is disclosed in JP-A S61-57436 and JP-A 2007-50815.

The vehicle seat assembly disclosed in JP-A S61-57436 has a seat and side supports that can support the side portions of the torso of an occupant sitting in the seat. The seat has a seat cushion and a seatback that can be moved to a position that, relative to the seat cushion, is upright or tilted forward. The side supports are positioned on the lateral surfaces of the seatback when the seatback is in the upright position, and are held in that position regardless of whether the position of the seatback is changed. A locking device is positioned on the rear side of the seatback in order to keep the seatback in the upright position.

The vehicle seat assembly disclosed in JP-A 2007-50815 has a seat and a flip-up mechanism for flipping up a seat cushion of the seat. The seat has a seat cushion and a seatback that can be moved to a position that, relative to the seat cushion, is upright or tilted forward. The flip-up mechanism is provided with a locking mechanism for keeping the seat cushion from swinging up. The lock mechanism is connected to an operating lever via an operating cable. The operating cable is divided into two sections that are connected by a connector. The operating lever is positioned so as to be set apart from the seat. Releasing the operating lever causes the lock mechanism to be released via the operating cable, whereupon the flip-up mechanism causes the seat cushion to flip up and forward. The seatback tilts forward in association with the flipping-up action of the seat cushion.

In the vehicle seat assemblies disclosed in JP-A S61-57436 and JP-A 2007-50815, typically, the lower portion of the seatback is foldably and erectably supported by a bracket. The seat is also provided with a spring for urging the seatback in the forward-tilting direction in order to enable the seatback to be readily tilted forward. It is desirable for an occupant to be able to sit comfortably in the seat over long periods of time despite the presence of the bracket and the spring. The bracket and spring are preferably installed in appropriate positions in the seat cushion and the seatback in order to improve the degree of comfort provided by the seat. For example, merely by having the spring provided in the back of the seatback, an occupant seated in the seat will feel pressure from the spring in their back through the seatback. The thickness of the seatback must be increased in order to prevent the occupant from feeling the pressure. It is also preferable for the bracket and spring to be hard to see when viewed from the exterior in order to enhance the outer appearance of the seat assembly.

In the vehicle seat assembly disclosed in JP-A 2007-50815, the operating cable and the connector are preferably not visible from the exterior in order to enhance the outer appearance of the seat. Measures need to taken so that the operating cable does not interfere with the seatback when the seatback is tilted up or down. There may also be instances in which an electrical component (such as an electric heater) is provided to the seat cushion and the seatback. Measures must be taken so that the operating cable and the electrical cables connected to the electrical component do not interfere with each other.

There is accordingly a need for a technique allowing the seat comfort to be increased while the outer appearance of the seat assembly is enhanced.

There is also a need for a technique whereby the operating cable via which the lock mechanism is released by the operating lever does not interfere with the seatback when the seatback is tilted up or down.

There is yet also a need for a technique whereby the operating cable and electrical cables do not interfere with each other when the seatback is tilted up or down.

SUMMARY OF THE INVENTION

According to the present invention, there is provided a vehicle seat assembly which comprises: a seat disposed in a passenger compartment of a vehicle; and a side support for supporting a side portion of a torso of an occupant seated in the seat, the seat having a seat cushion, a seatback capable of moving between an erected, upright position and a forwardly-folded, collapsed position relative to the seat cushion, and a seatback support mechanism for supporting the seatback in a foldable and erectable manner, wherein the side support is positioned between a lateral surface of the seatback and a vehicle body inside wall defining the passenger compartment, the seatback support mechanism includes a support shaft extending from the lateral surface of the seatback transversely outwardly of the vehicle, a bracket, mounted on at least one of the seat cushion and the vehicle body, for supporting the support shaft in such a manner as to be rotatable in a front-and-rear direction of the seatback, and a spring, provided between the support shaft and the bracket, for urging the seatback in a forwardly-folding direction, and the bracket and the spring are positioned near a rear surface of the side support.

Thus, a bracket for supporting a seatback so as to allow it to tilt forward and a spring for urging the seatback in a forward-tilting direction are positioned on the rear surface of a side support. Specifically, the space on the rear surface of the side support is effectively used to enable the bracket and the spring to be arranged. Therefore, neither the bracket nor the spring has an adverse effect on the seat comfort. An occupant can comfortably sit in the seat over long periods of time. Furthermore, the front sides of the bracket and spring are covered by the side support and are not visible. Therefore, the outer appearance of the vehicle seat assembly is enhanced.

Preferably, the side support comprises a generally plate-shaped lateral surface part positioned adjacent to and in opposed relation to the lateral surface of the seatback in the upright position, and a front surface part protruding toward a front part of the passenger compartment from a front edge of the lateral surface part and extending up to the inside wall of the vehicle body, the lateral surface part having a notched part at a rear edge thereof, so that the support shaft is allowed to pass through the notched part when the side support is installed in position between the lateral surface of the seatback and the inside wall of the vehicle body from forward to backward of the passenger compartment.

The lateral surface part of the side support is thus positioned adjacent to and opposite the lateral surface of the seatback in the upright position. Furthermore, the lateral surface part has a notch part that allows the support shaft to pass through. Therefore, the lateral surface part and front surface part of the side support can adequately cover the bracket and the spring. Even if a gap is present between the lateral surface of the seatback and the lateral surface part of the side support, the bracket and the spring will not be visible through the gap. The bracket and the spring will not be visible even if, for example, the gap is increased as a result of the lateral surface of the seatback being manually pressed toward the center with respect to the direction of vehicle width. The lateral surface part of the side support has a notched part by which a rear edge thereof is exposed. Therefore, once the seat has been mounted on the vehicle body, the support shaft can be inserted between the lateral surface of the seatback and the inside wall of the vehicle body when the side support is installed facing the rear of the passenger compartment with respect to the longitudinal direction. The seat side supports can accordingly be readily installed after the seat has been mounted.

Desirably, the vehicle seat assembly further comprises: a lock mechanism for locking the seatback in the upright position; an operating lever, being set apart form the seatback, for unlocking the lock mechanism; a first operating cable operatively connected to the lock mechanism; a second operating cable operatively connected to the operating lever; and a connector for connecting the first operating cable and the second operating cable, wherein the connector is positioned proximately to the rear surface of the side support.

The connector for connecting the first operating cable and the second operating cable is thus positioned on the rear surface of the side support. Thus, the front portions of the first and second operating cables and the connector are covered by the side support and are not visible. The outer appearance of the vehicle seat assembly is therefore enhanced.

In a preferred form, the vehicle seat assembly further comprises a support part for supporting the first operating cable on the vehicle body, wherein the support part is positioned proximately to the support shaft. The first operating cable is thus supported by the support part positioned near the support shaft. The seatback is tilted up or down about the support shaft. Therefore, when the seatback is tilted up or down, the first operating cable is only displaced about the support shaft, and only a minimal amount of displacement is required. Accordingly, the first operating cable does not interfere with the seatback when the seatback is tilted up or down.

Preferably, the first and second operating cables have end parts connected to the connector, and the first and second operating cables are anchored at portions proximate to the end parts by anchoring members to an accessory mounted on the vehicle body, the anchoring members being positioned proximately to the rear surface of the side support. The side support accordingly does not interfere with the 1st or 2nd operating cable when the side support is installed facing the rear of the passenger compartment with respect to the longitudinal direction, between the lateral surface of the seat back and the inside wall of the vehicle body. Accordingly, the task of installing the side supports is facilitated.

Desirably, the vehicle seat assembly further comprises: an electrical cable connected to an electrical component provided to at least one of the seat cushion and the seatback; and a bundling member for bundling the electrical cable along at least one of the first and second operating cables. Displacement accordingly occurs between the electrical cable and at least one of the first and second operating cables when the seatback is tilted up or down; therefore, the cables do not interfere with each other.

The vehicle seat assembly may further comprise a support part for supporting the first operating cable and the electrical cable on the vehicle body. The support part may be positioned proximately to the support shaft. The first operating cable and the electrical cable are thus supported by the support part positioned near the support shaft. The seatback is tilted up or down about the support shaft. Accordingly, it is only that the first operating cable and the electrical cable are displaced about the support shaft when the seatback is tilted up or down; therefore, only a minimal amount of displacement is required. The first operating cable and the electrical cable accordingly do not interfere with the seatback when it is tilted up or clown.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
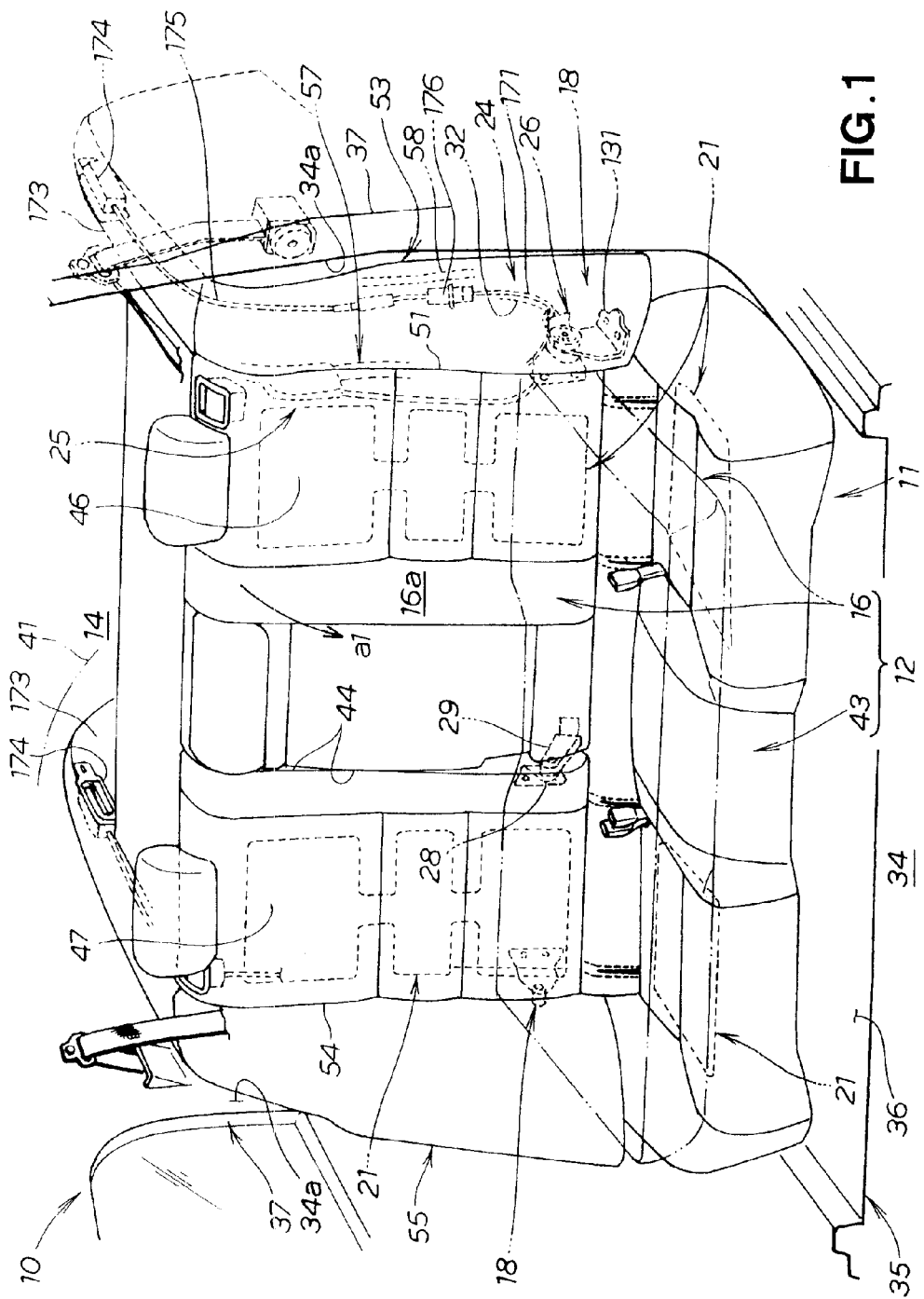
FIG. 1 is a perspective view showing a seat assembly according to the present invention, applied to a rear part of a vehicle.

As shown in FIG. 1, a vehicle 10 is a five-passenger hatchback-type automobile, and a front passenger compartment 34 and a rear luggage compartment 14 are formed inside the vehicle body 35. A partition wall is not provided between the passenger compartment 34 and the luggage compartment 14. The vehicle body 35 has an underbody structure 36 constituting the floor of the passenger compartment 34, and a rear body structure 37 constituting the rear end of the vehicle body 35. The rear body structure 37 has an opening (not shown) that is opened and closed by a tailgate 41.

The vehicle 10 is provided with a vehicle seat assembly 11. The vehicle seat assembly 11 has a seat 12 and left and right side supports 53, 55. The side supports 53, 55 are also referred to as side bolsters.

The seat 12 is a three-passenger bench-type rear seat, and has a seat cushion 43, a seatback 16, and a seat back support mechanism 26. The seatback 16 is capable of being tilted to an upright position relative to the seat cushion 43 (the position indicated by the solid line) and a position of being tilted forward as shown by arrow a1 (the position indicated by the dashed line). When in the upright position, the seatback 16 also functions as a partition wall between the luggage compartment 14 and the passenger compartment 34. The luggage compartment 14 and the passenger compartment 34 are caused to communicate when the seatback 16 is tilted forward. The seat cushion 43 is mounted on the underbody structure 36.

The seatback 16 may be composed of a single seatback member or a seatback member divided in to left and right parts. In the present example, reference is made to a seatback 16 configured from two separate left and right seatback members 46, 47. Even if the seatback 16 is configured from a single seatback member, the vehicle seat assembly 11 of the present invention can have substantially the same structure as if the seatback 16 were divided into left and right parts.

The left seatback member 46 is referred to below as the left seatback half 46. The right seatback member 47 is referred to as the right seatback half 47. The width of the left seatback half 46 is nearly two-thirds of the overall width of the seatback 16. Surfaces 44, 44 where the seatback 16 is divided; i.e., the lateral surface 44 inside the left seatback half 46 with respect to the width direction and the lateral surface 44 inside the right seatback half 47 with respect to the width direction face each other with substantially no gap therebetween.

The dividing surfaces 44, 44 are rotatably connected to one another by a connecting shaft 28. The connecting shaft 28 is supported by an intermediate bracket 29. The intermediate bracket 29 is mounted to the seat cushion 43 or the underbody structure 36. The left seatback half 46 and the right seatback half 47 accordingly can be tilted up or down either together or independently.

The rear surface of the seatback 16; i.e., the rear surfaces of the left and right seatback halves 46, 47, is mounted to seatback frames 57 (only the left seatback frame is shown). A seatback forward-tilting device 18 is used for mounting the left and right seatback frames 57 to the seat cushion 43 or the underbody structure 36 so that the seatback can be tilted up or down. The left seatback forward-tilting device 18 and the right seatback forward-tilting device 18 are of substantially the same configuration. There now follows a description of the left seatback forward-tilting device 18.

As shown in FIG. 1, the left seatback forward-tilting device 18 comprises a remote-operation device 24, a lock mechanism 25, and the seatback support mechanism 26.

The lock mechanism 25 locks the left seatback half 46 of the seatback 16 to the seat cushion 43 in an upright state of use.

As described above, the seat 12 includes the seatback support mechanism 26. The seatback support mechanism 26 foldably, and erectably supports, on vehicle body 35, a left side surface 51 of the left seatback half 46; i.e., an end surface 51 (side surface 51) of the seatback 16 facing outward with respect to the vehicle width direction. When the lock mechanism 25 is released, the seatback support mechanism 26 tilts the left seatback half 46 forward.

Figure 2:
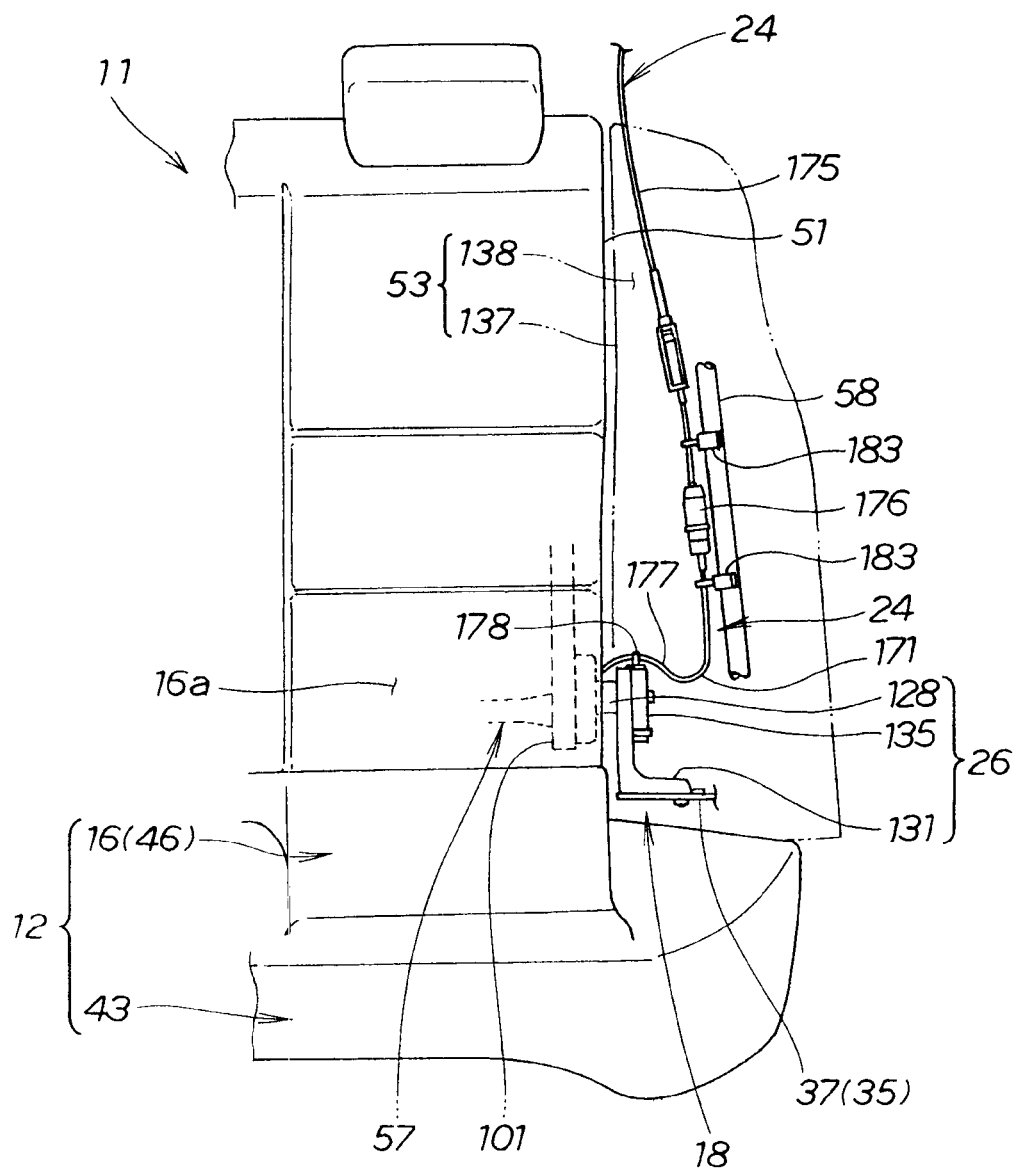
FIG. 2 is a schematic view showing on an enlarged scale part of the seat assembly of FIG. 1.
Figure 3:
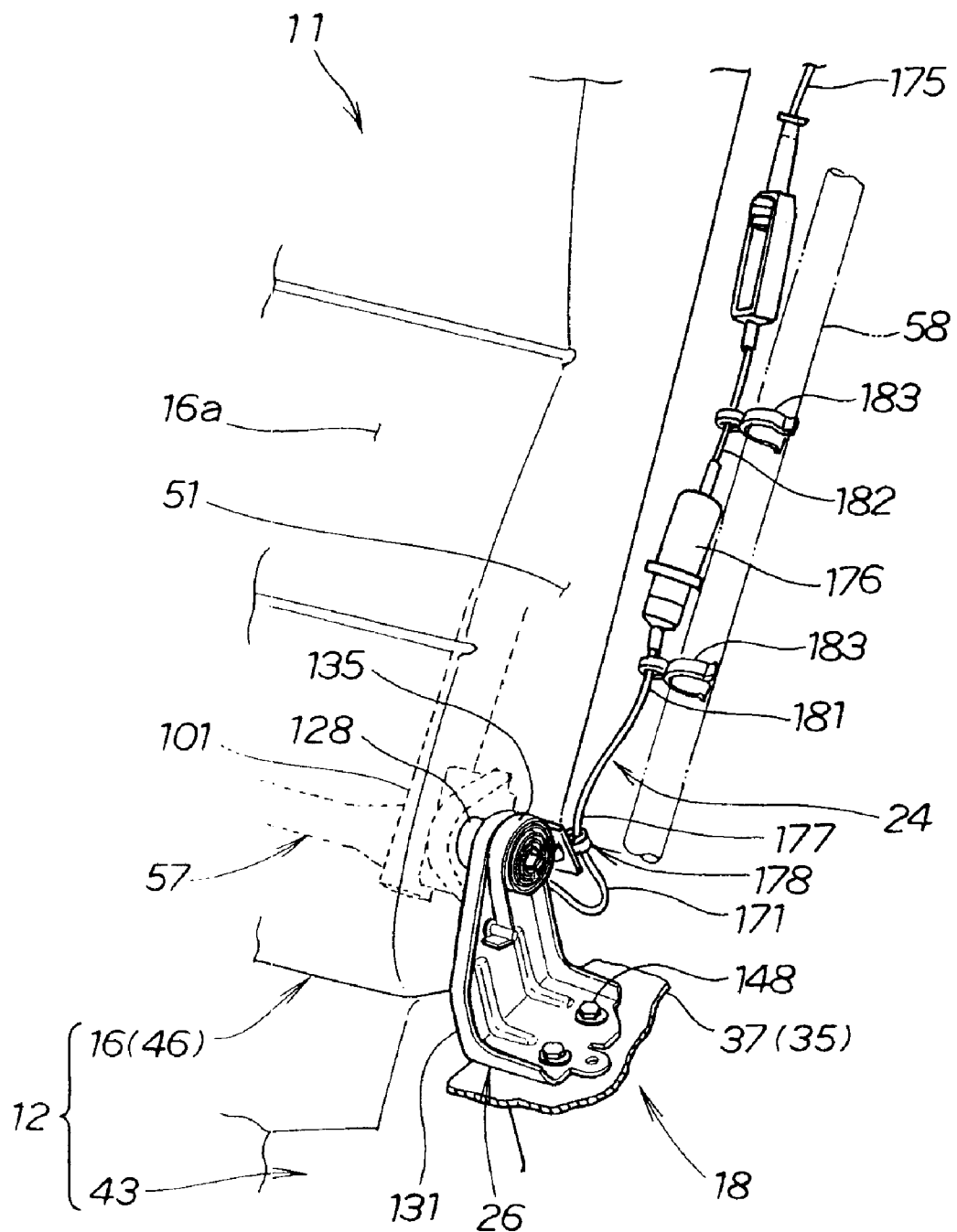
FIG. 3 is a perspective view showing the seat assembly of FIG. 2.
Figure 4:
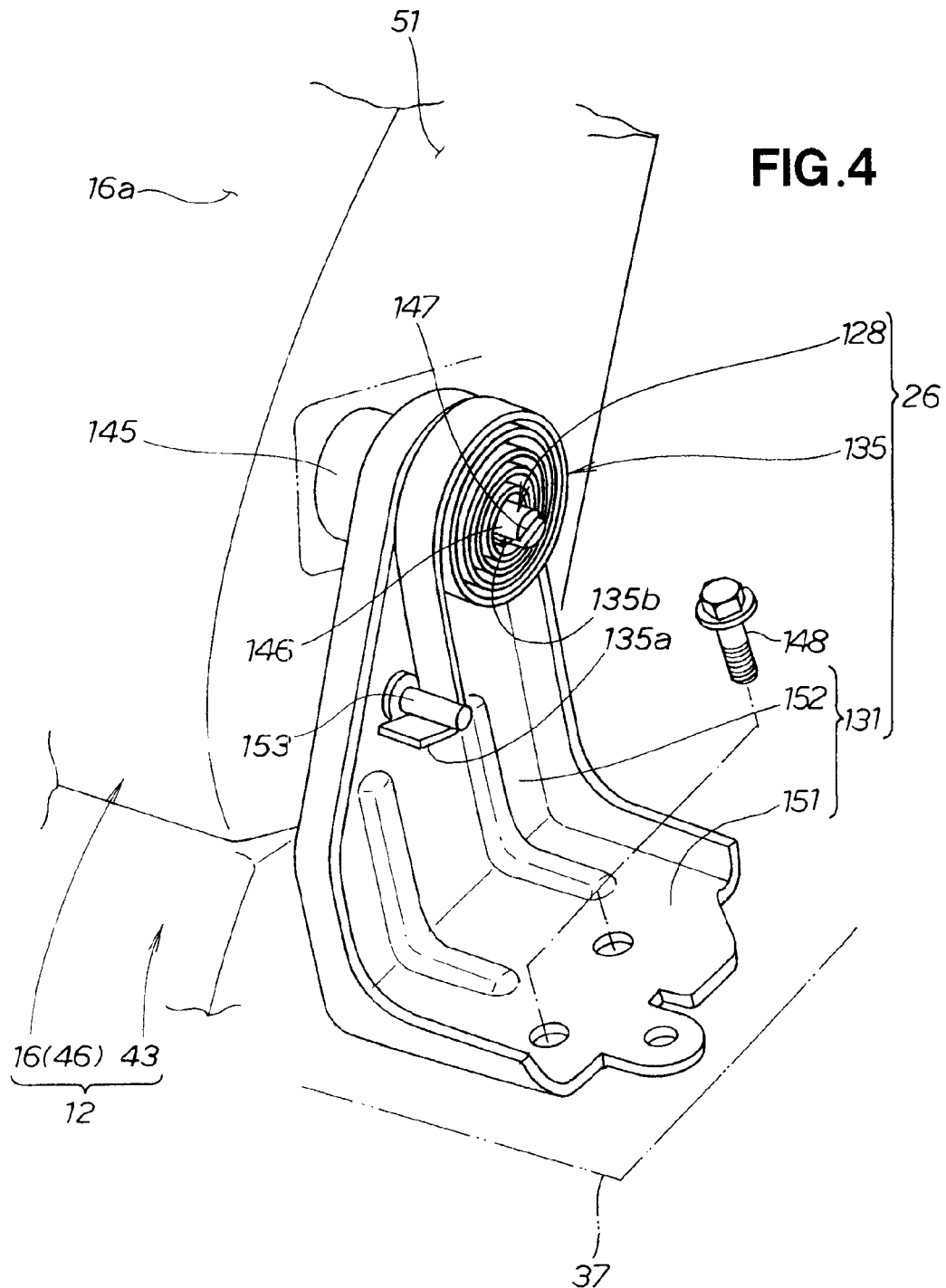
FIG. 4 is a perspective view showing on an enlarged scale a seatback support mechanism of FIG. 3.

As is shown in FIGS. 2 through 4, the seatback support mechanism 26 comprises a support shaft 128 extending from the lateral surface 51 of the seatback 16 toward the outside in the width direction of the vehicle; a bracket 131 for supporting the support shaft 128 so as to be capable of rotating in the longitudinal direction; and a spring 135 for urging the seatback 16 in the forward-tilting direction.

As shown in FIG. 4, the bracket 131 is a substantially L-shaped support member comprising a base part 151 mounted to the rear body structure 37 or the seat cushion 43 using a bolt 148; and a leg part 152 disposed upright from the base part 151. The leg part 152 is configured so as to support the support shaft 128, and also has a locking pin 153 for Locking the spring 135.

An end 145 of the support shaft 128 is mounted on a lower end of a vertical frame part 101 of the seatback frames 57 for supporting the rear surface of the left seatback half 46 (see FIG. 2). The other end 146 of the support shaft 128 is supported by the leg part 152 of the bracket 131, and has a slot 147 on a distal end thereof.

The spring 135 comprises a spiral spring that is wound around the support shaft 128. A first part 135a of the spring 135 is locked in place by the locking pin 153. The second end 135b of the spring 135 is inserted into and thereby locked in the slot 147. The spring 135 is thus provided between the support shaft 128 and the bracket 131 so as to urge the seatback 16 in the forward-tilting direction.

As shown in FIG. 1, left and right side supports 53, 55 (side bolsters 53, 55) are positioned between the left and right side surfaces 51, 54 of the upright seatback 16 and the inside walls 34a, 34a of the vehicle body 35 forming the passenger compartment 34. Specifically, the left side support 53 is positioned on the left side surface 51 of the seatback 16, and mounted on at least one of the underbody structure 36 and the rear body structure 37. The right side support 55 is positioned on the right side surface 54 of the seatback 16, and mounted on at least one of the underbody structure 36 and the rear body structure 37.

The left and right side supports 53, 55 are capable of supporting the lateral areas of the torso of a passenger (not shown) sitting in the seat 12. For example, the left and right side supports 53, 55 are capable of protecting passengers sitting in the seat 12 in the event of an external force acting on a side surface of the vehicle body 35.

There now follows a description of the left side support 53. As shown in FIGS. 1, 2, 5 and 6, the left side support 53 describes a curved shape protruding toward the front of the passenger compartment 34, and is a vertically oriented oblong member. The left side support 53 follows the left side surface 51 of the seatback 16; i.e., the side surface 51 of the left seatback half 46, and is positioned over substantially the entire height of the side surface 51. The left side support 53 protrudes toward the front of the passenger compartment 34 from a front surface 16a of the seatback 16.

Figure 5:
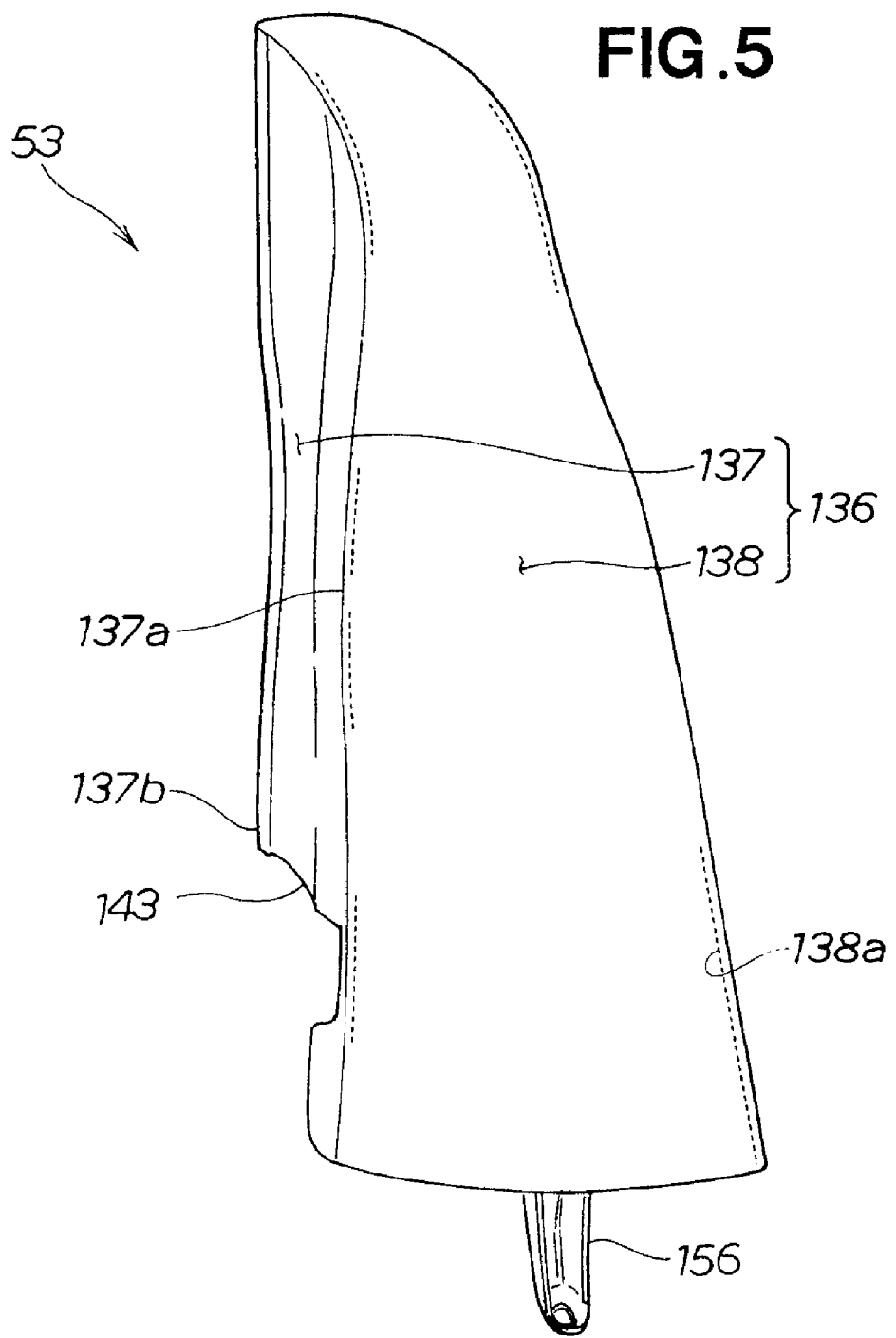
FIG. 5 is a perspective view showing a left side support of FIG. 1.
Figure 6:
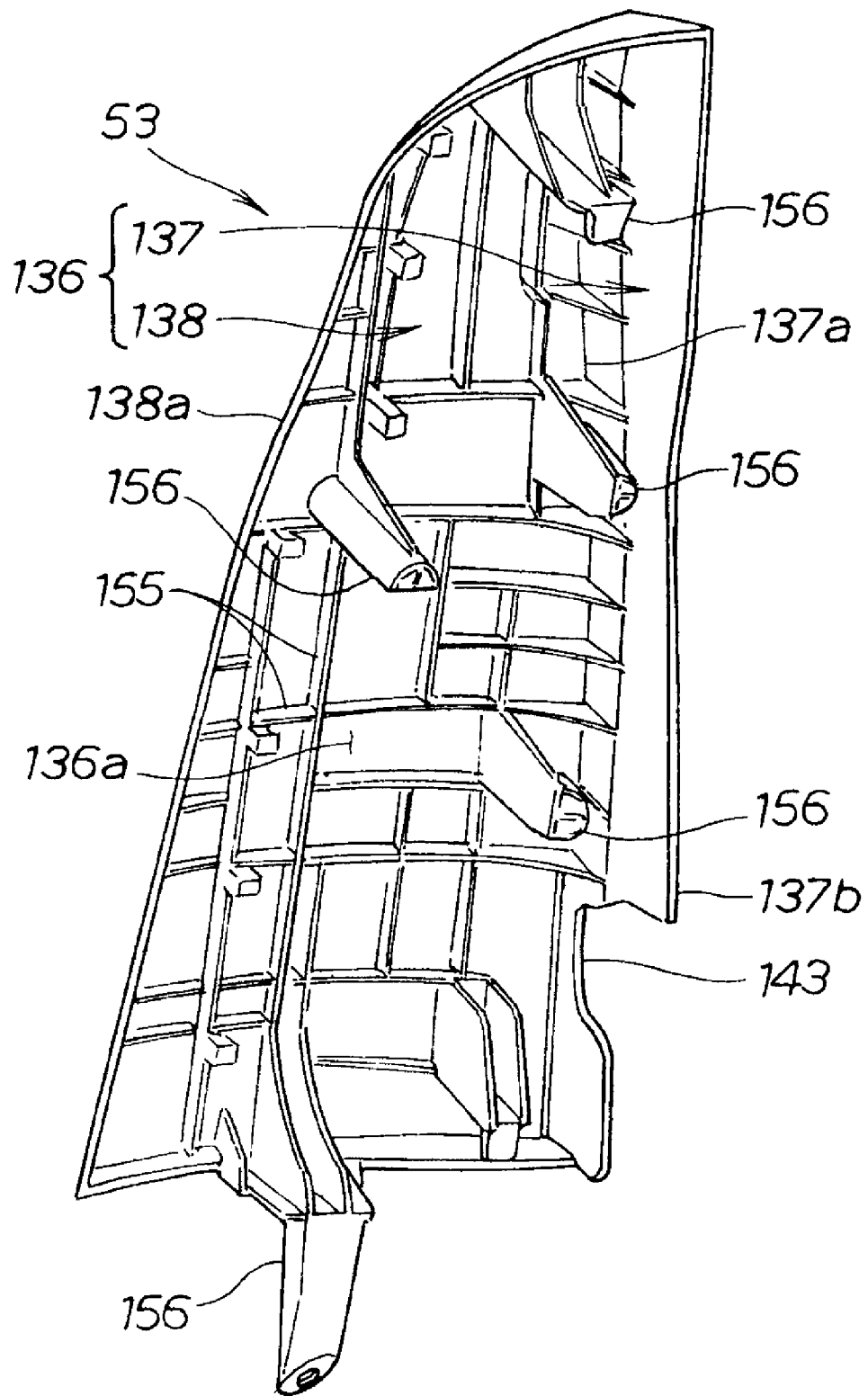
FIG. 6 is a perspective view showing a reverse side of the left side support of FIG. 5.

There now follows a more detailed description, with reference made to FIGS. 5 and 6. The left side support 53 is an integrated molded plastic article comprising a support body 136, a plurality of reinforcing ribs 155, and a plurality of stays 156. The support body 136 is a member constituting the basic backbone of the left side support 53, and is capable of holding the torso of an occupant. The surface of the support body 136 is covered by an outer covering (not shown).

The support body 136 comprises a lateral surface part 137 (inside wall part 137), and a front surface part 138. As shown in FIGS. 1, 2, 5 and 6, the lateral surface part 137 is a substantially plate-shaped member, and is positioned adjacent to and opposite the left lateral surface 51 of the seatback 16. The front surface part 138 is a member that is substantially as thick as the lateral surface part 137, the front surface part 138 protruding toward the front of the passenger compartment 34 from a front edge 137a of the lateral surface part 137, while extending to the left inside wall 34a of the vehicle body 35 (see FIG. 1). A front edge 138a that is on the outer side of the front surface part 138; i.e., the front edge 138a that faces the left inside wall 34a is positioned forward of the front edge 137a of the lateral surface part 137. The support body 136 is formed from the plate-shaped lateral surface part 137 and the arcuate front surface part 138, the cross-section of the support body 136 when viewed from above being substantially L-shaped.

A notched part 143 is located on the bottom of the lateral surface part 137. A rear edge 137b of the lateral surface part 137 opens onto the notched part 143. The support shaft 128 and the bracket 131 is positioned on a lower rear part of the left side support 53. With the seat 12 in a state of being mounted to the vehicle body 35, the lateral surface part 137 is positioned between the left side surface 51 of the seatback 16 and the leg part 152 of the bracket 131. The support shaft 128 passes through the notched part 143.

The reinforcing ribs 155 are members for reinforcing the support body 136, and are arranged in the shape of a grid on a rear surface 136a of the support body 136 (i.e., on the rear surface 136a of the left side support 53). The stays 156 extend from the rear surface 136a of the support body 136 towards the rear of the passenger compartment 34, and are mounted to the rear body structure 37 using bolts or another fastening member.

As follows from the description above, the bracket 131 and the spring 135 are positioned toward the rear surface 136a of the left side support 53 (see FIG. 6); i.e., in a space surrounded by the lateral surface part 137 and the front surface part 138. The space is effectively used to arrange the bracket 131 and the spring 135. Therefore, the bracket 131 and the spring 135 have no adverse effect on the seated comfort of the seat 12. The occupant is able to sit comfortably in the seat 12 for prolonged periods of time. Furthermore, the bracket 131 and the spring 135 are covered from the front side by the left side support 53, and rendered invisible. The outward appearance of the vehicle seat assembly 11 is accordingly enhanced.

The lateral surface part 137 of the left side support 53 is positioned so as to be adjacent to and opposite the left side surface 51 of the seatback 16 in the upright position. The lateral surface part 137 has the notched part 143 (see FIG. 6) through which the support shaft 128 is able to pass. Therefore, the bracket 131 and the spring 135 are able to be adequately covered by the lateral surface part 137 and front surface part 138 of the left side support 53. Even if a gap is present between the left side surface 51 of the seatback 16 and the lateral surface part 137 of the left side support 53, the bracket 131 and the spring 135 will be impossible to see therethrough. Even if the gap is increased, e.g., as a result of the left side surface 51 of the seatback 16 being manually pushed toward the widthwise center of the vehicle, the bracket 131 and the spring 135 will remain invisible.

The lateral surface part 137 of the left side support 53 has the notched part 143 onto which the rear edge 137b (see FIG. 6) opens. Therefore, once the seat 12 has been mounted to the vehicle body 35, the support shaft 128 can be passed between the left side surface 51 of the seatback 16 and the left side wall 34a of the passenger compartment 34 when the left side support 53 is installed facing the rear of the passenger compartment 34 with respect to the longitudinal direction. Accordingly, once the seat 12 has been mounted, the left side support 53 can be readily installed.

The right side support 55 is bilaterally symmetric to the left side support 53, but otherwise has substantially the same configuration, for which reason the description thereof is omitted.

As shown in FIGS. 1, 2, 3, 7 and 8, the remote-operation device 24 comprises a first operating cable 171 connected to the lock mechanism 25; a second operating cable 175 connected to the first operating cable 171 via a connector 176; and an operating lever 174 connected to the second operating cable 175 (see FIG. 1). The first and second operating cables 171, 175 are, e.g., wire cables. The operating lever 174 is provided to an inside wall 173 of the vehicle body 35 that forms the luggage compartment 14, and is set apart from the seatback 16, as shown in FIG. 1. The connector 176 is a member for connecting one end part 182 of the second operating cable 175 to one end part 181 of the first operating cable 171.

The operator opens the tailgate 41 (see FIG. 1), and releases the operating lever 174 from the luggage compartment 14 side, whereby the second operating cable 175 is pulled by the operating lever 174. Therefore, the lock device 25 (*1) is unlocked via the second operating cable 175, the connector 176, and the first operating cable 171. The seatback 16 accordingly tilts forward under the biasing force of the spring 135.

As shown in FIGS. 1 to 3, the connector 176 and a wiring harness 58 are positioned toward the rear surface 136a of the left side support 53 (see FIG. 6). The wiring harness 58 is a wiring component that integrates the wiring used for the electrical system of the vehicle 10 along with connection terminals and other components. As shown in FIGS. 1, 2, 3, 7, 8, 10, and 11, the wiring harness 58 is disposed along the left side surface 51 of the seatback 16, and is mounted to the vehicle body 35. This wiring harness 58 is an accessory mounted to the vehicle body 35. The end parts 181, 182 of the first and second operating cables 171, 175 are clipped or otherwise secured in place by a member 183, 183 to the wiring harness 58 (accessory 58).

The wiring harness 58, the end parts 181, 182 of the first and second operating cables 171, 175, the connector 176, and the anchoring members 183, 183 are positioned toward the rear surface 136a of the left side support 53 (see FIG. 6); i.e., in a space surrounded by the lateral surface part 137 and the front surface part 138 of the left side support 53. The space is effectively used to arrange the wiring harness 58, the first and second operating cables 171, 175, the connector 176, and the anchoring members 183, 183. There are no instances of the left side support 53 interfering with the wiring harness 58, the end parts 181, 182 of the first and second operating cables 171, 175, the connector 176, and the anchoring members 183, 183 between the left side surface 51 of the seatback 16 and the left side wall 34a of the vehicle body 35 when the left side support 53 is installed facing the rear of the passenger compartment 34 with respect to the longitudinal direction. Accordingly, the task of installing the left side support 53 is facilitated. In addition, the wiring harness 58, the end parts 181, 182 of the first and second operating cables 171, 175, the connector 176, and the anchoring members 183, 183 are covered from the front side by the left side support 53; and are incapable of being seen. The outward appearance of the vehicle seat assembly 11 is accordingly enhanced.

Figure 7:
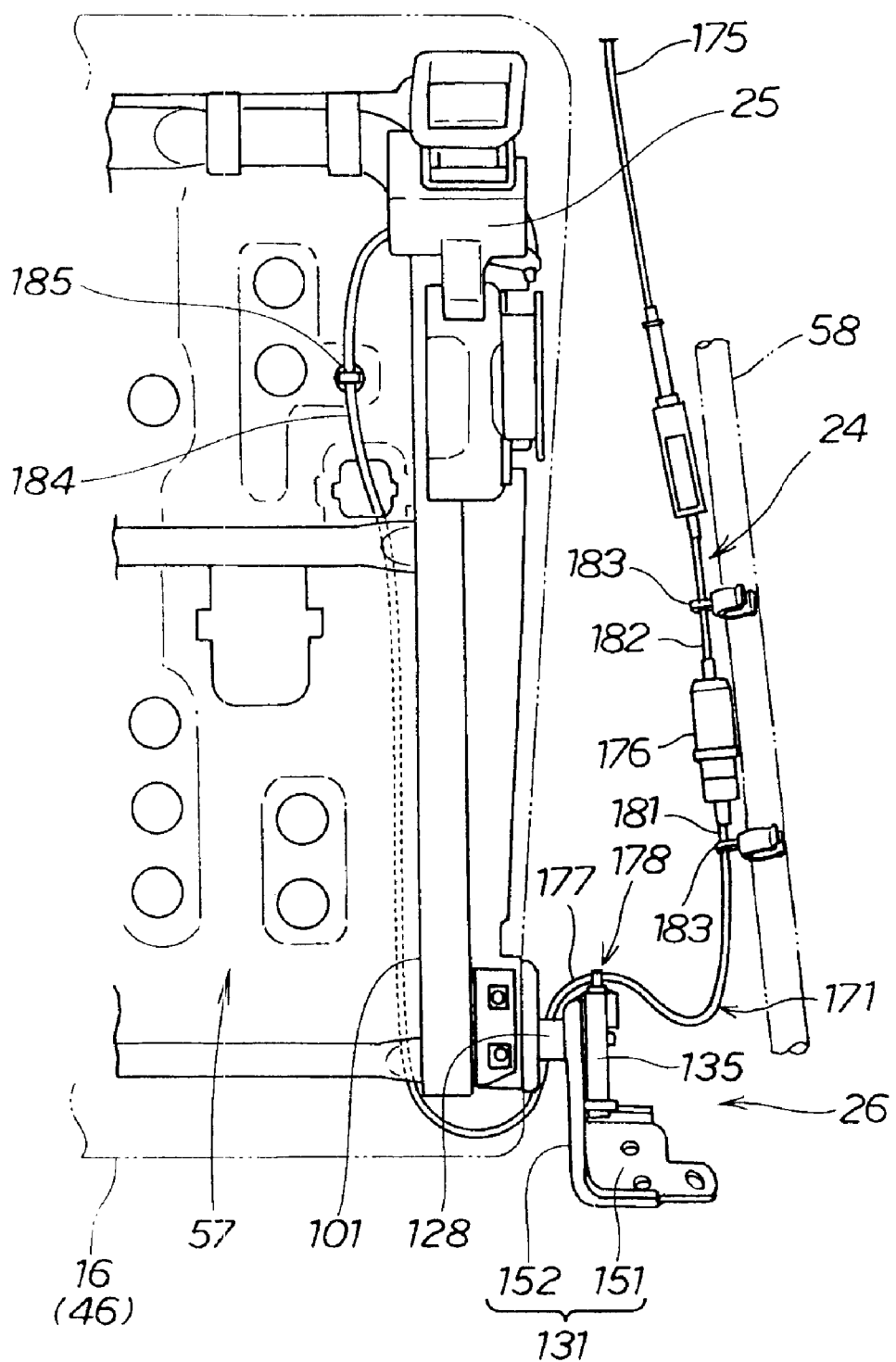
FIG. 7 is a schematic view showing the seat assembly along with a seatback frame of FIG. 2.
Figure 8:
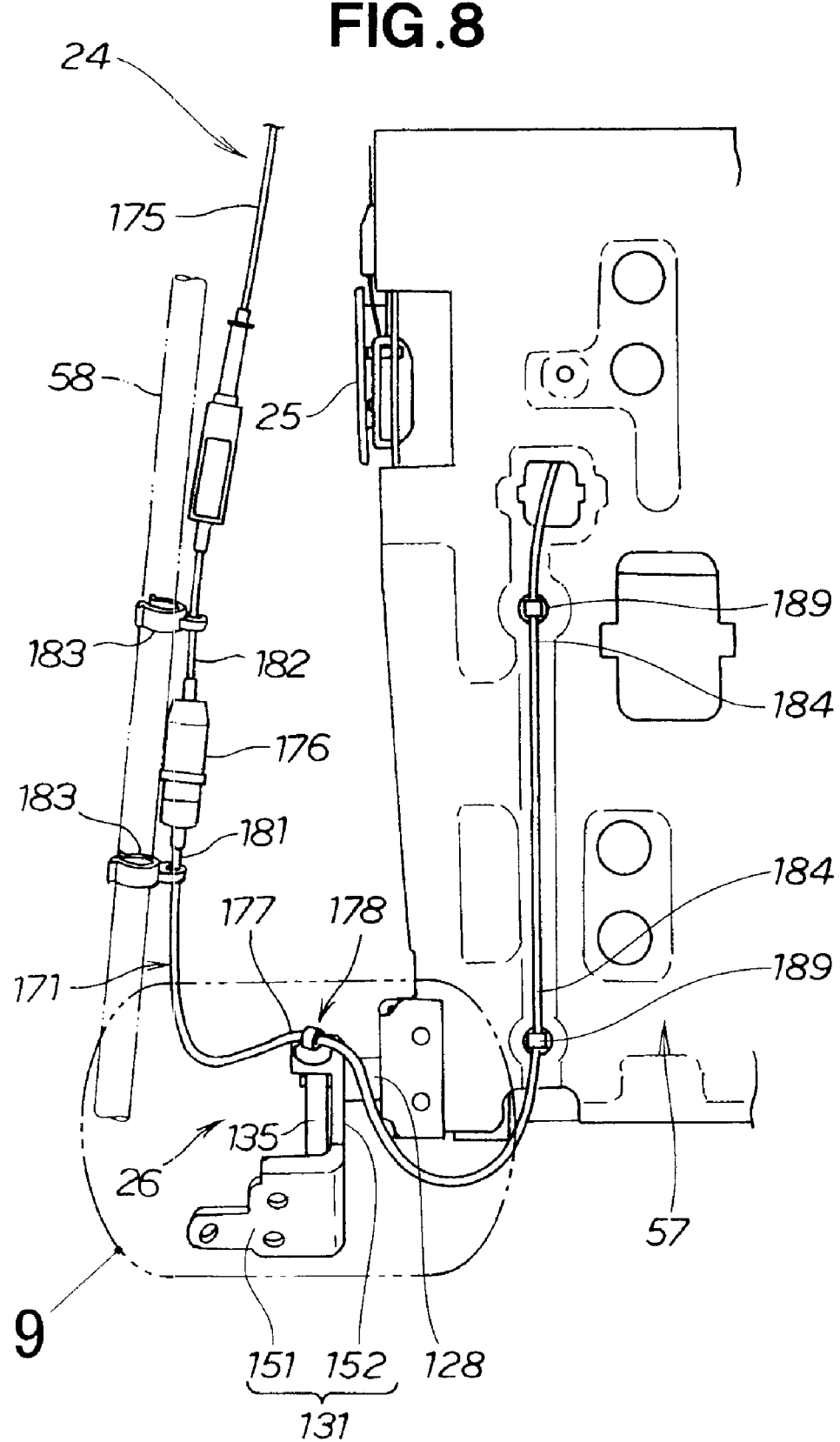
FIG. 8 is a rear view of the seatback frame and the seat assembly of FIG. 7.
Figure 9:
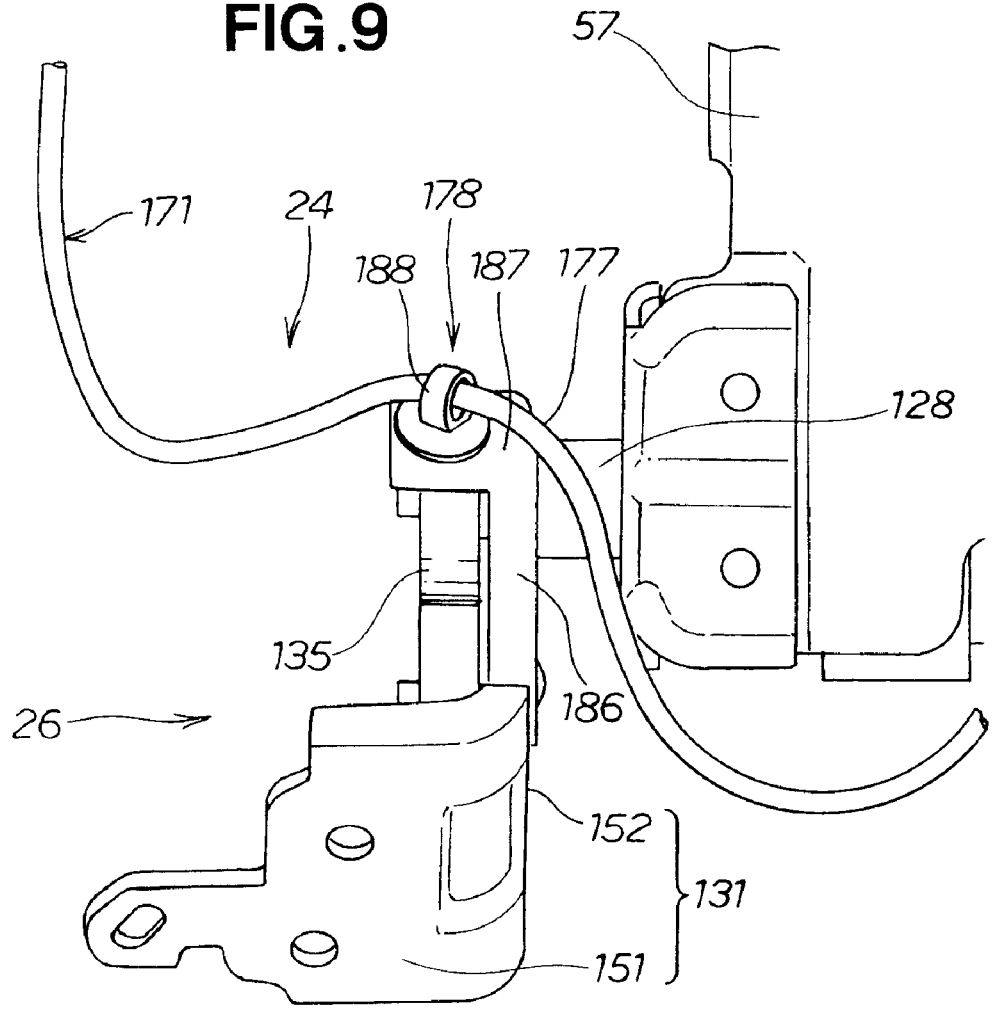
FIG. 9 is an enlarged view of area 9 of FIG. 8.

As shown in FIGS. 7 through 9, a middle part 177 of the first operating cable 171 is supposed on the bracket 131 by a support part 178. By "middle part 177" is meant a part of the first operating cable 171 situated near the support shaft 128. The support part 178 is positioned near the support shaft 128, and comprises a support arm 186 joined to the leg part 152 of the bracket 131 as well as a clamping member 188 mounted to a top part 187 of the support arm 186. The clamping member 188 comprises, e.g., a detachable clip.

As shown in FIGS. 7 and 8, the first operating cable 171 is immobilized on the seatback frame 57 by an anchoring member 185 in a predetermined location 184 between a portion connected to the lock mechanism 25 to the middle part 177. The anchoring member 185 comprises, e.g., a detachable clip.

There now follows a description of an example of a sequence in which the first operating cable 171 and the left side support 53 are mounted. As shown in FIGS. 7 and 8, first, the first operating cable 171 is connected to the lock mechanism 25. The first operating cable 171 is then fastened to the seatback frame 57 using the anchoring member 185. Next, as shown in FIG. 1, the seat 12 is loaded into the passenger compartment 34 and mounted to the vehicle body 35. The connector 176 is then used to connect the first operating cable 171 to the second operating cable 175, which has been mounted in advance to the luggage compartment 14. The left side support 53 is then inserted from the front of the seat 12, whereby the first and second operating cables 171, 172 and the connector 176 are covered. The task of mounting the first operating cable 171 and the left side support 53 thus concludes.

As shown in FIG. 1, a heater 21, which is a type of electrical component, is accommodated within the seatback 16 and the seat cushion 43. The heater 21 is used to provide warmth to the occupant of the seat 12. The heater 21 (electrical component 21) is provided to at least one of the seatback 16 and the seat cushion 43.

Figure 10:
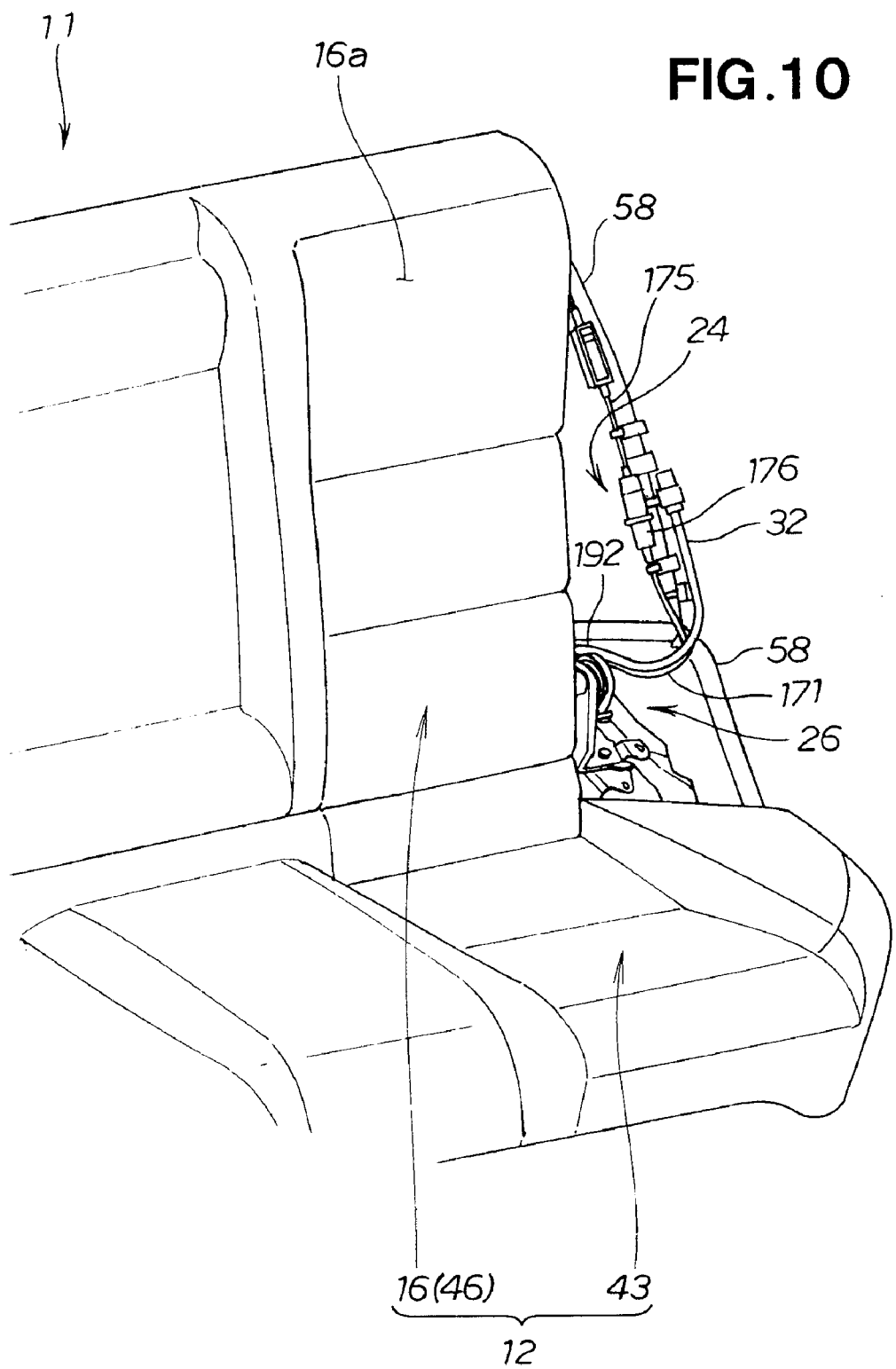
FIG. 10 is a perspective view showing an electrical cable as wired to a heater of FIG. 1.
Figure 11:
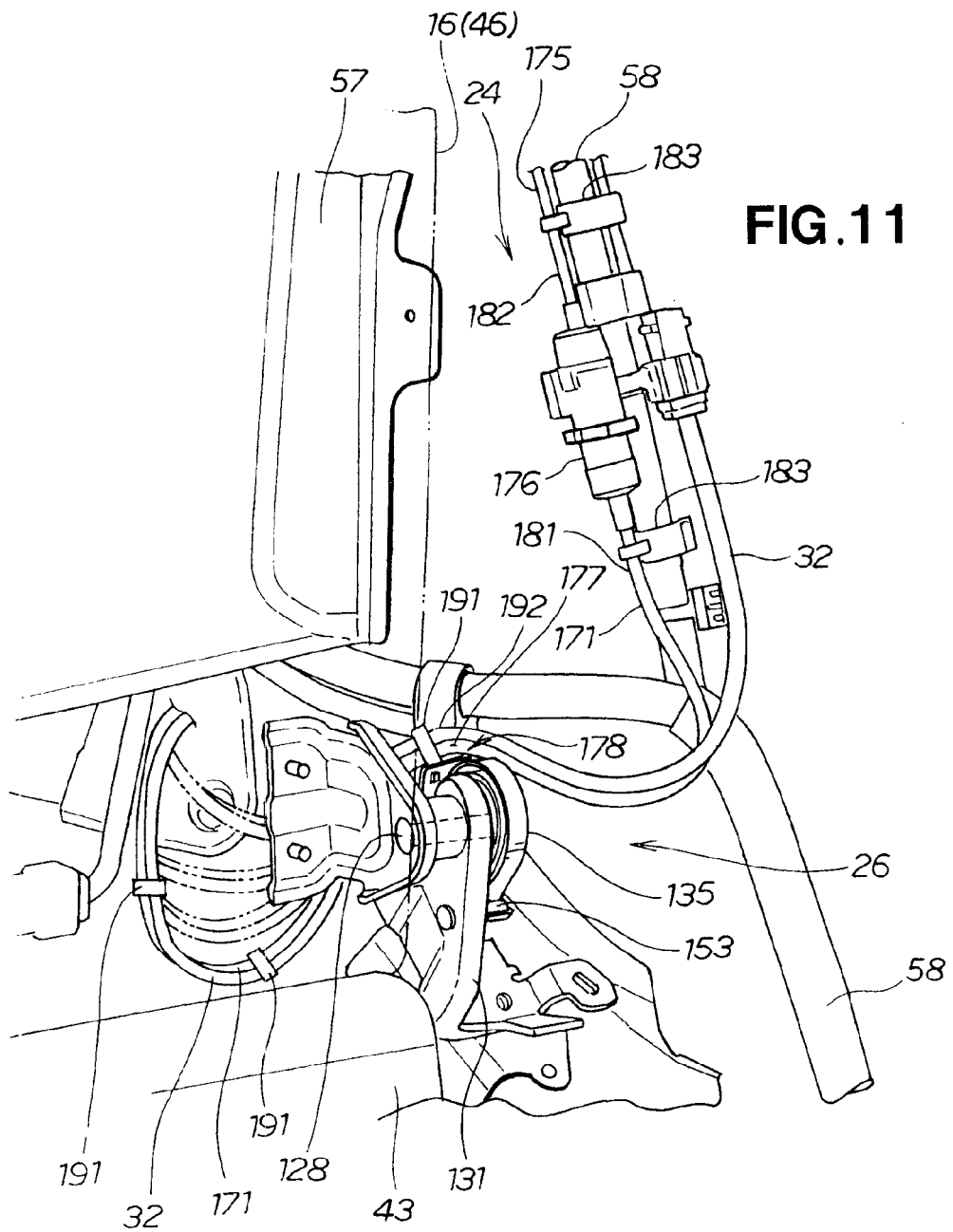
FIG. 11 is a schematic view illustrating a positional relationship between the electrical cable and a first operating cable of FIG. 10.

As shown in FIGS. 10 and 11, an electrical cable 32 (wiring 32) connected to the heater 21 and used for supplying electrical power is bundled using clips or another bundling member 191 so as to follow at least one of the first or second operating cables 171, 175. When the seatback 16 is tilted up or down, the electrical cable 32 will accordingly be displaced along with at least one of the first or second operating cables 171, 175 so that there is no interference therebetween.

Together with the first operating cable 171, the electrical cable 32 is supposed on the bracket 131 by the support part 178. A middle part 192 of the electrical cable 32 is therefore positioned together with the middle part 177 of the first operating cable 171 near the support shaft 128. The first operating cable 171 and the electrical cable 32 are thus supported by the support part 178 positioned near the support shaft 128. Meanwhile, the seatback 16 is tilted up or down around the support shaft 128. Therefore, the first operating cable 171 and the electrical cable 32 will only be displaced around the support shaft 128 when the seatback 16 is tilted up or down, meaning that only a minimal amount of displacement is required. Accordingly, the first operating cable 171 and the electrical cable 32 will not interfere with the seatback 16 when it is tilted up or down.

The vehicle seat assembly 11 of the present invention is suited for use in rear seats that have a seatback 16 capable of being tilted forward.

Obviously, various minor changes and modifications of the present invention are possible in light of the above teaching. It is therefore to be understood that within the scope of the appended claims the invention may be practiced otherwise than as specifically described.

What is claimed is:

1. A vehicle seat assembly comprising: a seat disposed in a passenger compartment of a vehicle; and a side support for supporting a side portion of a torso of an occupant seated in the seat, the seat having a seat cushion, a seatback capable of moving between an erected, upright position and a forwardly-folded, collapsed position relative to the seat cushion, and a seatback support mechanism for supporting the seatback in a foldable and erectable manner,
   wherein the side support is a separate trim member that is structurally independent from the seat and fixed to the vehicle body at a position between a lateral surface of the seatback and a vehicle body inside wall defining the passenger compartment,
   the seatback support mechanism includes a support shaft extending from the lateral surface of the seatback transversely outwardly of the vehicle, a bracket, mounted on at least one of the seat cushion and the vehicle body, for supporting the support shaft so as to be rotatable in a front-and-rear direction of the seatback, and a spring, provided between the support shaft and the bracket, for urging the seatback to move in a forwardly-folding direction relative to the side support, and
   the bracket and the spring are positioned near a rear surface of the side support.

2. The vehicle seat assembly of claim 1, wherein the side support comprises a generally plate-shaped lateral surface part positioned adjacent to and in opposed relation to the lateral surface of the seatback in the upright position, and a front surface part protruding toward a front part of the passenger compartment from a front edge of the lateral surface part and extending up to the inside wall of the vehicle body, the lateral surface part having a notched part at a rear edge thereof, so that the support shaft is allowed to pass through the notched part when the side support is installed in position between the lateral surface of the seatback and the inside wall of the vehicle body from forward to backward of the passenger compartment.

3. The vehicle seat assembly of claim 1, further comprising:
   a lock mechanism for locking the seatback in the upright position;
   an operating lever, being set apart from the seatback, for unlocking the lock mechanism;
   a first operating cable operatively connected to the lock mechanism;
   a second operating cable operatively connected to the operating lever; and
   a connector for connecting the first operating cable and the second operating cable,
   wherein the connector is positioned proximately to the rear surface of the side support.

4. The vehicle seat assembly of claim 3, further comprising a support part for supporting the first operating cable on the vehicle body, wherein the support part is positioned proximately to the support shaft.

5. The vehicle seat assembly of claim 3, wherein the first and second operating cables have end parts connected to the connector, and the first and second operating cables are anchored at portions proximate to the end parts by anchoring members to an accessory mounted on the vehicle body, the anchoring members being positioned proximately to the rear surface of the side support.

6. The vehicle seat assembly of claim 3, further comprising:
   an electrical cable connected to an electrical component provided to at least one of the seat cushion and the seatback; and
   a bundling member for bundling the electrical cable along at least one of the first and second operating cables.

7. The vehicle seat assembly of claim 6, further comprising a support part for supporting the first operating cable and the electrical cable on the vehicle body, wherein the support part is positioned proximately to the support shaft.

8. The vehicle seat assembly of claim 1, wherein said side support is a molded plastic article comprising a support body, a plurality of reinforcing ribs, and a plurality of stays.

9. The vehicle seat assembly of claim 8, wherein the side support comprises a generally plate-shaped lateral surface part positioned adjacent to and in opposed relation to the lateral surface of the seatback in the upright position, and a front surface part protruding toward a front part of the passenger compartment from a front edge of the lateral surface part and extending up to the inside wall of the vehicle body, the lateral surface part having a notched part at a rear edge thereof, so that the support shaft is allowed to pass through the notched part when the side support is installed in position between the lateral surface of the seatback and the inside wall of the vehicle body from forward to backward of the passenger compartment.

10. The vehicle seat assembly of claim 8, further comprising:
   a lock mechanism for locking the seatback in the upright position;
   an operating lever, being set apart from the seatback, for unlocking the lock mechanism;
   a first operating cable operatively connected to the lock mechanism;
   a second operating cable operatively connected to the operating lever; and
   a connector for connecting the first operating cable and the second operating cable,
   wherein the connector is positioned proximately to the rear surface of the side support.

11. The vehicle seat assembly of claim 10, further comprising a support part for supporting the first operating cable on the vehicle body, wherein the support part is positioned proximately to the support shaft.

12. The vehicle seat assembly of claim 10, wherein the first and second operating cables have end parts connected to the connector, and the first and second operating cables are anchored at portions proximate to the end parts by anchoring members to an accessory mounted on the vehicle body, the anchoring members being positioned proximately to the rear surface of the side support.

13. The vehicle seat assembly of claim 10, further comprising:
   an electrical cable connected to an electrical component provided to at least one of the seat cushion and the seatback; and
   a bundling member for bundling the electrical cable along at least one of the first and second operating cables.

14. The vehicle seat assembly of claim 13, further comprising a support part for supporting the first operating cable and the electrical cable on the vehicle body, wherein the support part is positioned proximately to the support shaft.

* * * * *